US006216059B1

(12) United States Patent
Ierymenko

(10) Patent No.: US 6,216,059 B1
(45) Date of Patent: Apr. 10, 2001

(54) UNITARY TRANSDUCER CONTROL SYSTEM

(76) Inventor: Paul Francis Ierymenko, 15 Monserrat Pl., Foothill Ranch, CA (US) 92610

( * ) Notice: Subject to any disclaimer, the term of this patent is extended or adjusted under 35 U.S.C. 154(b) by 0 days.

(21) Appl. No.: 09/395,671

(22) Filed: Sep. 14, 1999

(51) Int. Cl.[7] .................... G01M 1/38

(52) U.S. Cl. .................... 700/280; 700/54

(58) Field of Search .................... 700/280, 54, 279; 702/56, 104, 105; 381/71.7–71.14; 360/107

(56) References Cited

U.S. PATENT DOCUMENTS

| | | | | |
|---|---|---|---|---|
| 5,321,474 | | 6/1994 | Bares | 355/247 |
| 5,333,819 | * | 8/1994 | Stetson, Jr. | 244/164 |
| 5,409,078 | | 4/1995 | Ishioka et al. | 180/300 |
| 5,434,783 | * | 7/1995 | Pal et al. | 701/36 |
| 5,523,526 | | 6/1996 | Shattil | 84/728 |
| 5,593,311 | | 1/1997 | Bess et al. | 340/384.7 |
| 5,652,799 | | 7/1997 | Ross et al. | 381/71.11 |
| 5,668,744 | * | 9/1997 | Varadan et al. | 700/280 |
| 5,792,948 | * | 8/1998 | Aoki et al. | 73/116 |
| 6,018,689 | * | 1/2000 | Kumura et al. | 700/280 |
| 6,036,162 | * | 3/2000 | Hayashi | 248/550 |
| 6,125,008 | * | 9/2000 | Berg et al. | 360/261.2 |
| 6,128,552 | * | 10/2000 | Iwai et al. | 700/280 |

OTHER PUBLICATIONS

Stability of Control Systems, Ch. 7, Sec. 7.10, pp. 360–363.

* cited by examiner

*Primary Examiner*—Paul P. Gordon
*Assistant Examiner*—Zoila Cabrera
(74) *Attorney, Agent, or Firm*—Harold L. Jackson

(57) ABSTRACT

A control system controls the motion of a physical subject such as a mechanical system to damp or enhance the motion via a single transducer which alternates in a time-discrete manner between the task of reading a signal indicative of the state of the subject and the task of influencing said state by the application of a force. Control of motion or vibration is achieved through a series of actuating pulses interleaved with sensing operations. The same single transducer alternately acts as input to the control system from the subject and output from the control system to the subject. The control system provides full and individual control of all important harmonic modes of vibration of a subject mechanical system.

38 Claims, 5 Drawing Sheets

42
46
44
100c
N
100b
100a
v104
104
106
102
100
100c
S
108
116
112
i104
124
126
130
149
114
118
120
122
128
147
110
180
134
132
136
140
146
zero
ABS
150
152
144
168
170
172
174
Filter Bank
148
142
178
154
Ext. Input
166
162
156
Reference
Spectral Magnitude Subtractor
A/D
|FFT|
Output
158
164
160
157

UNITARY TRANSDUCER CONTROL SYSTEM

FIELD OF THE INVENTION

The present invention relates in general to a method and apparatus for controlling the motion or vibration of mechanical systems. More specifically, the invention describes a method for employing a single transducer for both the detection of motion and/or vibration and the application of motive force for the purpose of influencing and controlling the motion and/or vibration.

Definition of Terms and Discussion of Suitable Transducers for use in the Invention The terms "subject" and "subject mass" shall refer to the thing being controlled. As used herein these terms include but are not limited to a elastic mechanical system capable of one or more modes of vibration.

The term "control system" shall refer to the entire means coupled to the subject and employed to influence the state of the subject according to a reference or guiding signal or signals.

The term "controller" shall refer to the circuit means connected to the transducer. The controller comprises the sensing circuitry, the signal processing circuitry and the actuating circuitry that exists for the purpose of causing the subject to behave in accordance with a reference input.

The term "reference" shall refer to information about the desired state of the subject that may be provided to the control system. The control system's goal is to make the state of the subject conform to the reference. The reference information may be time domain data, frequency domain data, wavelet data, or any form appropriate to the particular calculations and algorithms of the control system. All control systems have a reference input, though in some cases this input may be implicit rather than explicit. For example, an input of zero may exist implicitly in a system designed only to dampen vibration.

The term "correction signal" shall refer to the output of the processor in the control system. It is the signal that the controller calculates must be applied to the transducer actuating time-channel in order to compel the subject's state to conform to the reference. In standard control system terminology, the term "error signal" roughly corresponds to the present term "correction signal". In one embodiment of the invention described herein, there is an error signal that is distinct from the correction signal.

The term "transducer" shall refer to the physical means through which the control system interacts with the subject. A "sensing transducer" inputs information about the subject to the control system. A "forcing transducer", also known herein as an "actuator", outputs a force under direction of the control system to effect changes in the state of the subject. A transducer may be capable of functioning as only a sensor, or as only a source of force, or as both. A transducer employed in the control system of this invention serves both functions, i.e., sensing and actuating.

The term "damping" shall refer to active damping as against passive damping. Passive damping is an example of a shorted generator and as such the power of the applied damping cannot be more than that available from the subject mass itself. In contrast to this, one of the present invention's capabilities is active damping, defined herein as the removal of energy from a vibrating mechanical system by the deliberate application of amplified force in opposition to the vibration.

Transducers capable of reciprocal, complimentary sensing and forcing functions and thus suitable for use with the present invention include but are not limited to the following:

- Electromagnetic transducers that generate a signal in response to a changing magnetic field and emit magnetic force as a result of an applied current; and
- Piezoelectric transducers that generate a voltage signal in response to a change in mechanical stress and change shape or exert a force in response to an applied voltage.

One contrasting example of a transducer that is not suitable for use with the invention is of the photo-modulation type. In this transducer, the motion of the subject modulates the transmission of light to a photo receptor, yielding a signal representative of that motion. This transducer is capable of sensing but not of actuating.

Discussion of Selected Prior Art and Objects of the Invention

Time-Channel Isolation Between Sensor and Actuator:

One goal of the invention is to solve the problem of unwanted coupling between sensor and actuator. For example, a prior art musical string sustaining system displayed in U.S. Pat. No. 5,523,526 ("'526 patent"), presents a variety of techniques for overcoming the problem of unwanted coupling between actuators and sensors in a control system, but none is as simple or as successful in practice as the present invention. In a control system, loop gain is often limited primarily by the degree of the direct response of the sensor to the actuator. Known techniques to reduce this include shielding between sensor and actuator and subtraction of unwanted coupling. The goal of all such techniques is that the sensor should sense the state of the subject but not of the actuator. In the present invention, isolation is accomplished by time-separation. Sensing is performed at a time after the application of force has been stopped, when field effects that create unwanted coupling have subsided. Thus the sensor reads the new state of the subject resulting from the previous application of force, but the sensor does not respond to the actuating force itself.

The present invention provides any arbitrary degree of time-channel isolation. As it is possible to wait almost forever between forcing and sensing events, the isolation can be almost infinite. In practice, there is a trade-off between isolation and sampling frequency. The parameters of this compromise are dependent upon the particular transducer technology and material composition. Combinations of technologies and materials that support an extraordinary degree of isolation at relatively high sampling rates do exist; an electromagnetic transducer employing magnetic materials having low losses at high frequencies is but one example.

Control of Multiple Subjects in Parallel:

It is a further goal of the invention that a plurality of subjects and associated control systems may operate in close proximity to each other without significant compromise. Each subject, individually associated with one instance of the control system, may be controlled by a unique control loop function or by the same control loop function without cross interference between the control systems. This is facilitated by the definite and discrete timing structure of the invention. As a result, a plurality of parallel control systems may be synchronized in time. All sensing events and actuating event time channels may be coincident. Within such an array of control systems, any one control system's sensing function may be as isolated in time from an adjacent control system's actuating event as it is from its own actuating event.

Scaling of Mass and Frequency:

A further goal of the invention is that it should be applicable to subjects having small mass as well as those having large mass. The invention exhibits a natural complimentary scaling of mass and frequency: A decrease in transducer and subject geometry favors an increase in operating frequency and vice versa. Everything may be scaled together in a complimentary fashion, permitting a wide latitude of application.

Compact Design:

Another goal of the invention is that the transducer means be of compact design. The single transducer of the invention provides an advantage in this respect over prior, dual transducer systems.

Sensing of Velocity and of Position:

A further object of the invention is to enable the sensing of both velocity and position of the subject mass. In cases where an electromagnetic transducer is employed it is possible to exploit the settling behavior of the actuation transient to detect the proximity of the subject mass. This facilitates control of both position and motion. A detailed explanation of this follows further below.

Variable Control Rate:

It is an objective of the invention to provide for both fixed and variable rates of alternation between sensing and forcing events. In mechanical systems that are excited by an impulse, the natural tendency is for higher modes of vibration to die down faster than lower frequency modes. In some such cases it is an advantage to vary the actuation and sampling rate over time. Greater range of control power and greater practical time-channel isolation is thereby realized.

Complimentary Transfer Characteristics:

A further goal and benefit of the invention is that the transfer characteristics of the forcing and the sensing time-channels are, for all practical purposes identical compliments. This is because the same physical transducer is used for both functions, though at different times. Unlike control systems that employ separate transducers for the sensing and actuating functions, the present invention requires no compensation for differences in the transfer characteristics of the sensor and the actuator. This reduces cost and improves performance over other control systems.

Elimination of Complex or Adaptive Control Loop Compensation:

A further objective of the invention is to greatly reduce or eliminate the need to compensate for the transfer function through the subject mass between sensor and actuator. To accomplish this, the physical location of the transducer with respect to the subject must be the same during the sensing time-channel and the actuating time-channel. The invention meets this condition by using a single transducer for both functions. Rather than being separated in space, the actuating and sensing functions are separated in time. This effectively eliminates any contribution of the transfer function through the subject mass from the overall control loop transfer function. In its place is a time delay term that can be made arbitrarily short. The foregoing is true to the extent that the subject's position with respect to the transducer remains substantially unchanged during the delay between the sensing and the forcing event times. That criterion is well met by subjects that vibrate in place; the distance between the transducer and the subject changes incrementally according to the phase of vibration, but the position changes very little if at all. The criterion is of course perfectly met in the case where the invention is employed to dampen all motion of the subject.

The significance of this can be appreciated by considering the conventional case of spatially separated actuator and sensor control systems. If the subject is a complex mechanical system, the transfer characteristic through it involves time delay and phase shift that may vary as a complex function of frequency. This transfer characteristic appears in the overall control loop function and must be compensated if stable and accurate control is to be achieved. A significant body of prior art is devoted to solving exactly this problem. U.S. Pat. Nos. 5,652,799 and 5,409,078 are two examples of many patents disclosing control systems using multiple sensors and actuators and necessitating various computationally expensive adaptive filters and algorithms to solve different manifestations of the same basic problem.

The present invention eliminates this problem and can greatly simplify many existing control systems. Precise and stable control of the subject at the position where the transducer couples to the subject is achieved without computationally expensive compensation filters.

Control of Subjects Having Changing Mechanical Characteristics:

Subjects that exhibit resonances that change in frequency rapidly and unpredictably over time pose a very difficult control system problem. Fixed compensation schemes are ruled out as a control solution since such a system is constantly and unpredictably changing. Adaptive algorithms are computationally expensive and may require too much time to converge to keep up with the changing subject. Such subjects are difficult, expensive and/or impossible to control using known control means employing separate sensing and actuating transducers.

A corollary benefit of the single transducer concept of this invention is that its simple delay-term control loop transfer characteristic is independent of the transfer characteristics of the subject being controlled. Thus the present invention is capable of controlling subjects having physical dynamics that change quickly over time.

One interesting example of such a "variable" subject is the mechanical system consisting of a vibrating musical instrument string upon which a musician is playing. In the act of fretting and plucking the string, the musician frequently and abruptly changes the length and therefore the natural vibrating frequencies of the string. A control system coupled to the string for the purpose of controlling the vibration of the string would be subject to the difficulties described above. However, the present invention is able to control a vibrating string, as is discussed in detail further below.

Complete Harmonic Control:

It is an objective of the invention to provide a means of precise and discriminatory control of each and all important modes of vibration of a subject mass. Using the invention, the most basic and opposite forms of vibration control, the promotion of vibration and the dampening of vibration, are simple to achieve and do not require any filters in the control loop. Between these extremes are found many interesting and useful functions made possible by the invention's capability of promoting and sustaining some modes of vibration while inhibiting and dampening others. To accomplish this, the force exerted by the transducer upon the subject must be precisely controlled with respect to frequency, amplitude, phase, polarity, and must be a suitable function of the past motion of the subject. In this context, promotion of all vibration and damping of all vibration are seen as special cases of the more general case of complete harmonic control.

Patents such as the '526 patent discloses an imprecise means of achieving some control of which harmonics are promoted in a string vibration sustaining system, but there does not seem to be any prior art that discloses means of systematically, reliably and completely achieving this objective. As will be explained in detail below, the present invention makes possible the practical realization of complete harmonic control.

Limitations of the Present Invention

In the present invention, there exists a time delay from when the state of the subject is sensed to when force is applied to the subject. This is a simple and predictable delay term that can be easily handled to achieve stability in the control system by employing well known compensation means as is described in *Stability of Linear Control Systems with Time Delays,* Benjamin C. Kuo, Automatic Control Systems, 3$^{rd}$ Edition, Prentice Hall. P. 360 Section 7.10.

The proper operation of the invention rests on the assumption that the state of the subject changes very little during the interval between the sensing and the forcing events. This assumption can be maintained by prescribing a delay that is short relative to half the period of vibration of the subject's highest frequency of interest. It is not unusually or impracticably difficult to meet this criterion, as will be shown further below.

As is the case with all control systems, it is possible to control only those attributes of the subject sensed by the sensor. For example, a subject that vibrates in both a horizontal and a vertical mode might be coupled to a transducer sensitive to only the vertical component of vibrations. In that case, direct control of the horizontal component of the subject's vibrations is not possible. Also, to control vibration in a subject the transducer must be deployed at a point on the subject where the vibration is not at a null.

To facilitate substantially smooth control, the subject coupled to the transducer must have sufficient mass to integrate the series of discrete actuator forcing events.

As the transducer serves a dual purpose, the transducer is not available as an actuator 100% of the time. In practice, it may be available less than 60% of the time. Therefore, the invention may not be suitable in applications where maximum utilization of the transducer power capability is the dominant criterion.

It should be noted that all control systems employing a force transducer have an implied mechanical reference input in addition to the explicit (and often electrical) reference input. Since the force exerted by the transducer acts between the transducer and the subject, the physical reference frame of the transducer directly affects the subject. It appears to be taken as convention in many patents that the force transducer is assumed to be at rest with some implied absolute reference frame, but in practice it is necessary to consider the reaction of the transducer to the force it exerts against the subject mass. For example, a transducer that promotes or suppresses vibration in the subject should itself have sufficient mass so as not to vibrate in anti-phase with the subject mass. Alternately or additionally the transducer should rest upon some other thing with sufficient mass or stiffness to produce the desired effect.

Within the limits indicated, the present invention makes possible lower cost and simpler control systems for controlling subjects that previously required control systems employing computationally expensive adaptive and fixed compensation signal processing means. Furthermore, the present invention extends closed loop control to the control of subjects that could not be effectively controlled with previous systems.

Some Shortcomings of Prior Art Utilizing Separate Sensing and Actuating Units:

Consider the simple application of dynamic damping of a fixed mechanical subject, as disclosed in U.S. Pat. No. 5,321,474 ("'474 patent") that utilizes a separate actuator and sensor for the purpose of damping the vibration in an electrode wire in a xerographic apparatus. In the system disclosed in the '474 patent, damping is produced only in the specific case where each mode of vibration is exactly countered by a force in opposition to it. The overall control loop's transfer function includes the mechanical transfer function of the wire. The output of the sensor must be processed by a loop compensation filter that adjusts the phase of the canceling signal fed to the driver to compensate for the phase shift through the wire from driver to sensor so that the force produced by the driver may properly act to inhibit vibration of the wire at the sensor. The wire's vibrations can be damped only because the characteristics of the wire as a mechanical system are mostly fixed and predictable and can be compensated for by a fixed compensation filter.

Consider next the situation that obtains when the transfer function of the subject to be damped is indeterminate or quickly changing. This kind of subject is exemplified by the behavior of a musical instrument string when a musician plays upon it. If one were to apply the system of the '474 patent to dampen the vibrations of such a string, the loop compensation filter would have to adapt to every change of the string's mechanical transfer function. It would have to do this in real time, even as the musician unpredictably changed the string's length and modes of vibration. This is a fundamental limitation of systems that achieve motion control using separate sensor and driver transducers and where the transfer function of the subject being controlled is therefore entangled with the transfer function of the controller. True precise control of vibration implies not just the ability to sustain a vibration but the ability to dampen a vibration. Note that the '526 patent does not describe a system capable of damping the vibration of such a string, but rather systems capable of only sustaining the vibration.

In the case of a musical instrument string that undergoes abrupt changes in length and tension, the goal of complete harmonic control using separate actuator and sensor transducers has remained unrealized. The present invention achieves this goal by unifying the sensor and actuator. No previously known system is capable of arbitrarily promoting or suppressing each of all possible modes of vibration of a subject mass.

SUMMARY OF THE INVENTION

Unlike prior control systems that employ separate actuator and sensor transducers, the present invention employs a single transducer for driving and sensing a physical subject. Rather than being separated in space, the actuating and sensing functions are separated in time.

A control system in accordance with the present invention comprises a controller connected to a unitary or single transducer and more particularly to a sensor/actuator circuit thereof. The controller, under appropriate programming, sets up, in discrete time-division fashion, two time channels within a time frame, i.e., a sensing time-channel to read the state of motion or position of the subject mass and an actuating time-channel to apply an input signal to the sensor/actuator circuit to cause the transducer to exert a variable force against the subject mass. The sensor/actuator circuit may comprise a shared transducer connection, i.e., the same sensor and actuator terminals, or it may comprise separate connections which are electrically isolated but closely coupled through the transducer. For example, the sensor/actuator circuit may, in the case of an electromagnetic transducer, comprise a single winding on a magnetic core or two or more windings on the same core. For a piezoelectric transducer the sensor/actuator circuit may comprise a single pair of electrodes or more than one pair of electrodes positioned on the piezoelectric crystal, as will be explained in more detail.

Both the sensing and actuating events occur at a single location relative to the subject mass being controlled. As there is no physical distance through the subject separating the actuator and sensor, this arrangement yields a simple unit-delay control loop transfer function that is substantially independent of the transfer function through the subject. Force feedback to the subject is calculated by a signal processing circuit and acts to impel and constrain the motion or vibration of the subject to a desired state as determined by a reference input.

An arbitrary harmonic spectrum may be imposed upon a vibrating subject mass according to a reference input descriptive of said spectrum. An additional input signal may be applied to the control system to excite the subject.

Scope of Applications

The scope of possible applications of the invention encompasses most areas where motion control has been used in the past, and the particular benefits of the invention extend its utility beyond areas served by present control systems. The present invention provides the means to cause each important mode of vibration of a mass to conform to a reference. Applications of the invention may include but are not limited to magnetic bearings and magnetic levitation systems, the control of motion and vibration in machinery including in miniaturized machines (nanomachines), robotics, novel types of motors, loudspeaker linearization and novel musical instruments. Motion and vibration suppressors in general, and motion and vibration inducers in general, would fall within the invention's scope.

The present invention may be best understood by reference to the following description taken in conjunction with the accompanying drawings in which like components are designed by the same reference numerals.

BRIEF DESCRIPTION OF THE DRAWINGS

FIG. 11 is a detailed examination of control system events occurring during the first ⅛ of the time scale of FIG. 12. For clarity in FIG. 12, the subject's frequency of vibration is made exactly $1/6^{th}$ the sampling frequency of the control system. The control system sampling frequency need not be synchronized with the subject vibration and it typically would not be. Nor would the correction signal and the subject's vibration necessarily be similar or in phase, as is implied by the figure.

DESCRIPTION OF THE PREFERRED EMBODIMENT

Figure 1:
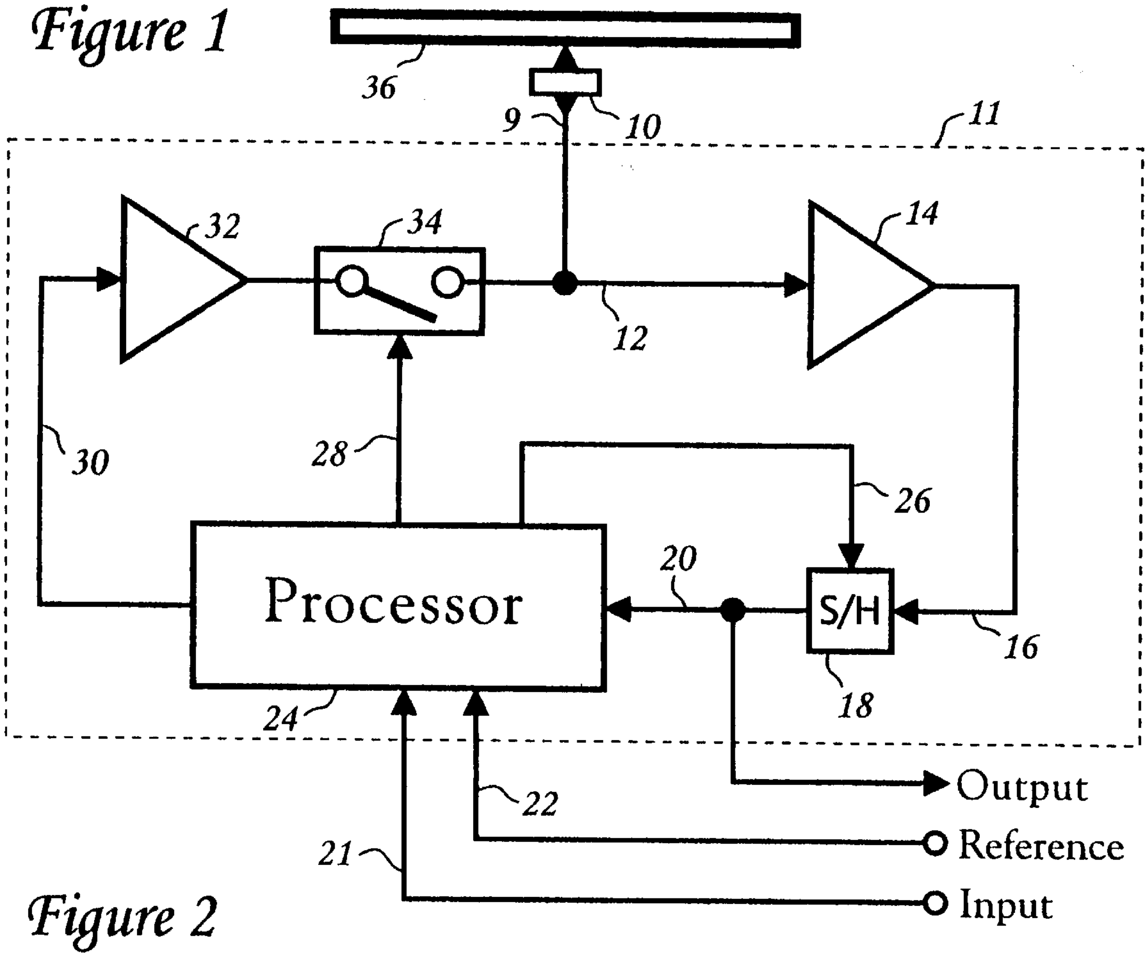
FIG. 1 is a block diagram of a generalized control system in accordance with the invention.

FIG. 1 shows a diagram of the generalized control scheme utilizing a transducer 10 which is coupled to a physical subject 36 such that the actuation energy and information concerning the energy of the subject state can be exchanged between the subject and the transducer. The form of energy transfer depends upon the type of transducer. For example, a piezoelectric transducer would exchange energy with the subject via mechanical force while an electromagnetic transducer would exchange energy with the subject via electromagnetic force. In all cases there would be a bi-directional exchange of energy between the transducer and the subject. The unconventional transducer symbol 10 of FIG. 1 is intended to convey this bi-directional capability. The transducer includes a sensor/actuator circuit designated generally at 9 which (a) provides a sensing output signal which is a function of the motion or energy of the subject 36 and (b) receives an actuating input signal for causing the transducer to alter the motion of the subject.

A controller 11 includes a sense amplifier 14 which is connected to the sensor/actuator circuit 9. The amplifier 14 buffers and amplifies the transducer output signal 12. A sample and hold function circuit 18 exists for the purpose of sampling and retaining the subject state information (i.e., transducer sensing output signal) during the calculating intervals. Circuit 18 samples the amplified output of amplifier 14. In some implementations of the invention the sample and hold circuit may consist of an analog sample and hold circuit incorporating an electronic switch and a hold capacitor. In other implementations, the functionality of circuit 18 may be realized as an analog to digital converter that would present the information to a signal processor 24 in digital form. Other methods of achieving the sample and hold function are possible.

A signal processor 24 compares the signal 20 from sample and hold circuit 18 against a reference signal 22 and generate a correction signal that acts to change the behavior of subject 36 in accordance with reference 22. The processor 24 contains signal processing means of analog, digital, optical, or any other type for effecting any appropriate control algorithm for controlling the behavior of subject 36 in a manner according to reference signal 22 and control input 20. The processor 24 also contains conventional means (not shown) for generating timing signals for controlling system events and forming the actuating signal according to its corrected calculated correction.

In summary, the controller is programmed to sample the transducer output signal during the sensing time channel of each successive time frame and for applying the actuating signal to the transducer (i.e., to the sensing/actuating circuit) during an actuating time channel of each successive time frame.

In some applications the subject will be excited by mechanical events external to the control system but in other applications it may be necessary or advantageous to provide an external signal input 21 ("excitation signal") to the transducer sensor/actuator circuit during the actuating time channel to excite the subject or to change its position. The excitation signal may be of any suitable form including a noise signal, a fixed level or an impulse. It should be noted that the reference signal 22 need not have a finite value, but may have a non-value or zero depending upon the application. For example, a vibration damping application may not require an explicit reference (or an input signal at 21). The reference then would be implicitly zero. In contrast, a harmonic control application may require a spectral profile signal 22 as a reference and an impulse input signal 21 to initiate vibration of the subject. The reference may include additional data such as ambient temperature, time of day etc. The nature of the reference signal will depend on the application.

Figure 2:
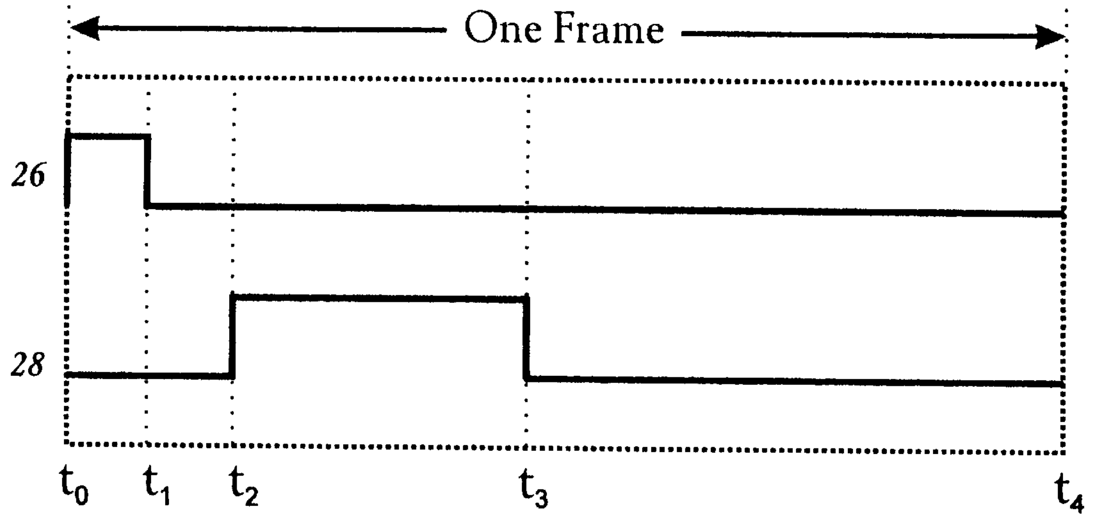
FIG. 2 is a waveform diagram illustrating the waveforms appearing on nodes 26 and 28 of FIG. 1.

The control system can be understood by examining FIG. 1 with respect to the timing diagram of FIG. 2. The interval from $t_0$ to $t_4$ represents one complete frame of events and it is understood that frames repeat sequentially during operation, i.e., $t_4$ is really $t_0$ of the next frame. Signals 26 and 28 are shown in the timing diagram of FIG. 2 and correspond to signals 26 and 28 of FIG. 1.

Initially, signal 28 is low or de-asserted and switch 34 is off. Amplifier 14 is responsive to transducer output signal 12 developed by transducer 10 and informative of the state of subject 36. At time $t_0$, signal 26 from the processor commands block 18 to sample signal 16. At time $t_1$, signal 26 is turned off and stable sample output signal 20 is presented to processor 24. Time $t_0$ to $t_1$ thus constitutes the sample acquisition time. Signal 20 also constitutes the sampled transducer output of the system and provides a means to monitor the motion of the subject.

Between $t_1$ and $t_2$ processor 24 calculates a correction signal or signals as a function of the sample input 20 and reference 22. The output signal 30 from the processor represents the correction signal in the absence of input 21 and after amplification, via amplifier 32, is supplied via switch 34 to the sensor actuator circuit 11 of the transducer. The correction signal modulates the actuating signal that is used to actuate the transducer and all of this occurs within the same frame time so the bandwidth-governing loop response delay time is much smaller than the time between samples. This is the minimal delay method and results in the greatest system bandwidth. An alternate scheme allows more calculation time at the expense of increased loop delay. In the alternate scheme processor 24 has available the entire duration from $t_1$ to $t_4$ of frame n to calculate a correction for the frame n+1. In this pipeline mode of operation, processor 24 would output the stored result of a previous calculation while simultaneously calculating the correction signal for the next frame.

The minimal delay method allows greater bandwidth but less time for calculation. The pipeline method provides more time for calculations at the expense of greater delay and consequent lower bandwidth. Both methods can by used either singly or together. Complex control system calculations could involve several stored past values of signal 20 spanning several frames. In contrast, damping of vibration can be achieved with a processor block 24 calculation as simple as the inversion and amplification of signal 20. Such damping can therefore be achieved with absolutely the minimum possible delay and therefore the greatest bandwidth. All such processor block 24 methods and control calculations are intended to fall within the spirit and scope of the invention.

The actuating event begins at $t_2$ when signal 28 closes switch 34 and initiates a force that acts between the transducer and the subject. At $t_3$, signal 28 returns to its rest state and switch 34 is opened. Note that the actuating event may proceed for some time after $t_3$ due to energy stored in the transducer but by design the actuating event will have subsided to provide the required degree of isolation before $t_4$. ($t_4$ is in fact $t_0$ of the next frame).

There are two basic methods available for causing the transducer's actuating force to be proportional to the calculated correction output of processor 24. The first method achieves amplitude modulation of the actuator while the second method achieves pulse-width modulation of the actuator. This second method is more efficient as it allows low loss power switching techniques to be employed, though it will generate more electromagnetic interference than the first method.

In the amplitude proportional method, switch 34 connects drive amplifier 32 to the transducer at time $t_2$. The output of amplifier 32 is an amplified signal directly proportional to output 30 of processor 24. As a consequence transducer 10 exerts a force proportional to the output of processor 24 upon subject 36 for the entire fixed interval $t_2$–$t_3$. This may be termed "pulse amplitude modulation" or "PAM". In a variation of PAM, during each event frame output 30 of processor 24 may consist of a smoothly shaped curve such as a cosine shaped pulse that begins and ends at zero and that is amplitude and polarity modulated according to that frame's calculated correction value. The output of amplifier 32 may be a current rather than a voltage. When such a current pulse amplitude modulation scheme is used in conjunction with an electromagnetic transducer, a subtle benefit is gained. The output impedance of the actuating circuit remains high at all times so there is no passive damping of the subject during the actuation interval.

In the time proportional method, amplifier 32 provides a fixed magnitude signal of a polarity controlled by signal 30, and the magnitude output of processor 24 is expressed as the on-time of switch 34 controlled by the pulse duration of signal 28. (Note that in this case the time proportional actuating signal is converted from the correction output of processor 24 via signal 30 and signal 28.) The transducer thus exerts an actuating force during some part of the interval $t_2$–$t_3$. The duration is proportional to the calculated output of processor 24. Either or both edges of signal 28 may be modulated, but all assertions of signal 28 must occur within the interval $t_2$–$t_3$. This may be termed "pulse width modulation", or "PWM".

Many variations of the foregoing are possible. Both methods may be used in combination. Switch 34 may be realized implicitly as an attribute of amplifier 32 as could be the case if amplifier 32 was a bipolar current source. Switch 34 may be two switches, one connected between the transducer and a positive source and the other connected between the transducer and a negative source; signal 28 would then be steered to the appropriate switch according to the desired polarity. To achieve pulse width modulation, either or both edges of the actuating signal may be modulated by the correction signal during the interval $t_2$–$t_3$. All such variations are considered to be subsumed within the invention's concept that the force applied to the subject by the transducer is proportional to the correction signal output of a control block algorithm or calculation and occurs during a prescribed portion of the frame time that does not overlap the sensing time interval.

When switch 34 is opened at $t_3$, the actuating force begins to abate and the transducer returns to its sensing mode. The system is allowed to settle for the remaining duration of the frame time up to $t_4$, when the next frame begins and a fresh sample of the new state of subject 36 is taken by the means previously described ($t_4$ of one frame is coincident with $t_0$ of the next frame).

Subject 36 will be have been moved, accelerated, decelerated or otherwise incrementally affected by the force applied during each event frame. A succession of event frames constitutes piece-wise control of the subject's state or behavior.

Figure 3:
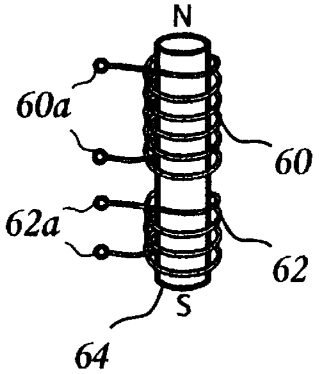
FIGS. 3, 4, 5, 6, and 7 are schematic views illustrating a variety of transducers and connections suitable for use with the invention.

Referring now to FIGS. 3–7 various transducer configuration suitable for use in the control system are illustrated. As shown in FIG. 3, it may be advantageous to use a plurality of separate windings on a single pole piece 64 of an electromagnetic transducer, for example employing one such winding for the actuating current and a second winding for the sensing function. The two windings and associated terminals 60*a* and 62*a* would collectively constitute the transducer sensor/actuator circuit. As windings 60 and 62 would be closely coupled to one another, the resulting device would retain the essential characteristics of a single winding transducer. The absence of direct electrical coupling between the actuating and the sensing circuits does not thwart the intent of the invention and indeed may be an advantage in some implementations.

Figure 4:
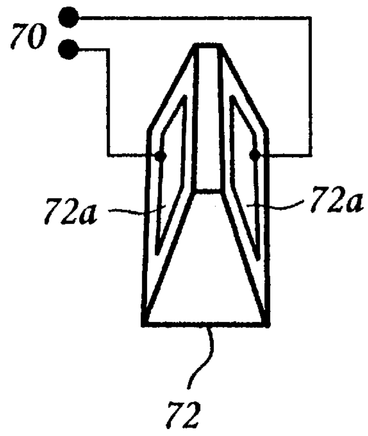

FIG. 4 shows a piezoelectric transducer with electrodes 72*a* and terminals 70 constituting the sensor actuator circuit. Piezoelectric structure 72 may itself be the direct subject of a control system in a manner analogous to the arrangement of FIG. 8. Alternately, structure 72 may be mechanically coupled to a distinct subject mass. In either case, deforming stress of structure 72 will give rise to a field voltage that can be sensed between the electrodes at termination 70 during the sensing control interval. During the actuating interval, termination 70 can be driven with a voltage that would cause piezoceramic structure 72 to change shape and/or transmit mechanical force to a subject. A piezoelectric transducer is thus shown to be suitable for use with the invention.

Figure 5:
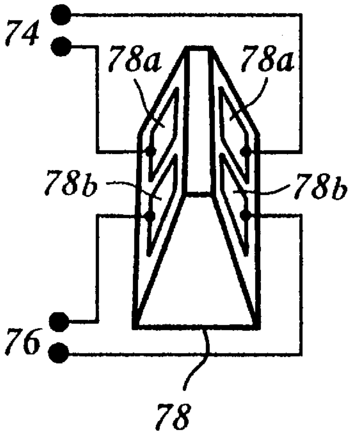

FIG. 5 shows a transducer 78 similar to that of FIG. 4, but with separate electrode pairs, i.e., 78*a* and 78*b* constituting the sensor/actuator circuit, the pair 78*a* and termination 74 for sensing and pair 78*b* and termination 76 for actuating. This is the piezoelectric analog to the transducer of FIG. 3 and the same explanations apply.

Figure 6:
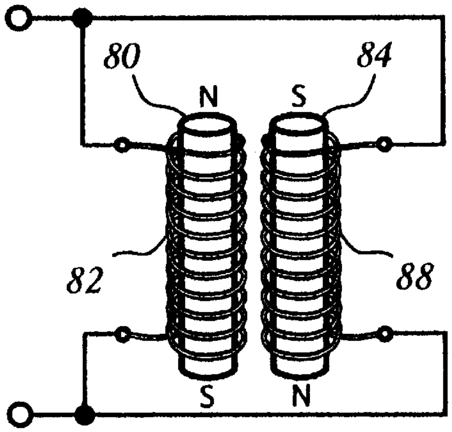

As shown in FIG. 6, the unitary or single transducer arrangement of the present invention may include two separate magnetic cores 80 and 84 and windings 82 and 88 which are connected together. The cores and associated windings are deployed in parallel with windings and magnetic poles reversed. An external interfering field would induce one signal phase on winding 82 and an opposite, canceling signal phase on counter-wound coil 88. This arrangement is the familiar "hum-bucking" pickup arrangement that rejects external impinging magnetic fields. When used with the present invention, this configuration has the added advantage of reducing electromagnetic interference, (EMI). Fields emanating from the two cores during the actuation interval cancel in space as they propagate. Any vibrating ferrous subject within coupling proximity of the tops of magnets 80 and 84 generates an equal voltage of the same phase on both windings 82 and 84 that can be sensed and sampled by a control system. When the same paralleled windings are driven by a control system actuator current, the action of the resulting magnetic field is such that the magnetic field modulation in magnet 80 and 84 has the same phase with respect to the subject, so the arrangement can exert control forces upon the subject. It will be obvious to one skilled in the art that there are several ways to achieve the objectives of the circuit of FIG. 6. Notably, winding 88 can be wound in the same direction as winding 82 and cross-connected with winding 82 rather than directly paralleled as shown, with much the same effect. Also, one of the windings may be passive, not coupled to the subject and/or not wound upon a magnet but existing only for the purpose of canceling external fields. In summary, with respect to the subject, the whole transducer assembly acts substantially as though it was one single magnet and winding, with the exception that it rejects external interference, and all such transducer assemblies are within the scope of the invention.

Figure 7:
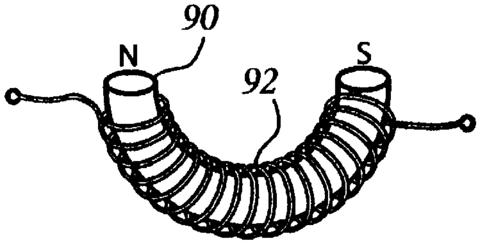

Different shapes of transducers are possible. FIG. 7 for example shows a solenoid 92 in the shape of a semicircle. Either or both poles of magnet 90 could be coupled to a subject.

Under certain circumstances the subject mass of the control system may itself form part of the transducer. In the example shown as FIG. 8, a stretched steel wire 42 is the subject of a control system that acts to promote or inhibit vibrations upon the wire. The same wire 42 serves as the conductive element of the electromagnetic transducer of the control system. The subject wire 42 is stretched between anchors 44 and 46 and its endpoints and is electrically connected to controller 48 via connector wires 50 and 52 Vibrating wire 42 cuts the lines of force produced by magnet 39 and generates a voltage proportional to velocity across the wire that is sensed during the sensing interval by controller 48, a controller according to the present invention. During the actuating interval, controller 48 directs an actuator current through wire 42 that is proportional to the control function's response to the sensed subject velocity and reference information 22. This current gives rise to a magnetic field that interacts with the magnetic field emanating from the magnet 40 and produces an attractive or repulsive magnetic force between the wire and the magnet. Over a series of such events, wire 42 is compelled to follow the reference. If the reference is zero, the result is the dampening of vibration.

Figure 8:
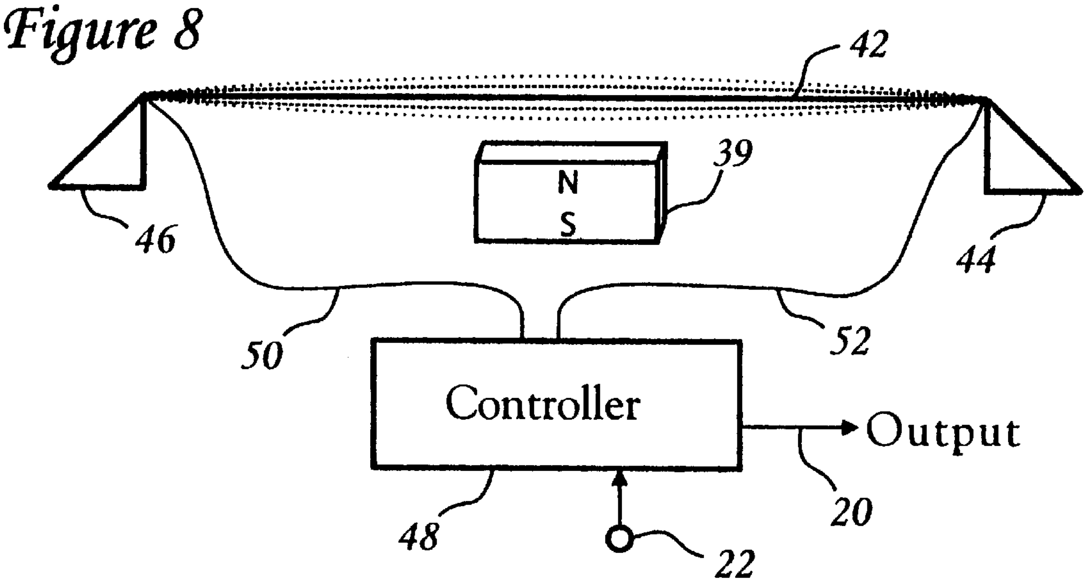
FIG. 8 is a schematic diagram of one embodiment where a part of the transducer and the subject are merged.

In the case of FIG. 8 the subject is the conducting wire 42 of the transducer, but it may be easily seen that magnet 39 could be the subject and the winding fixed. These kinds of variations are found when the general principle is applied in the field of electric motors, for example.

Figure 9:
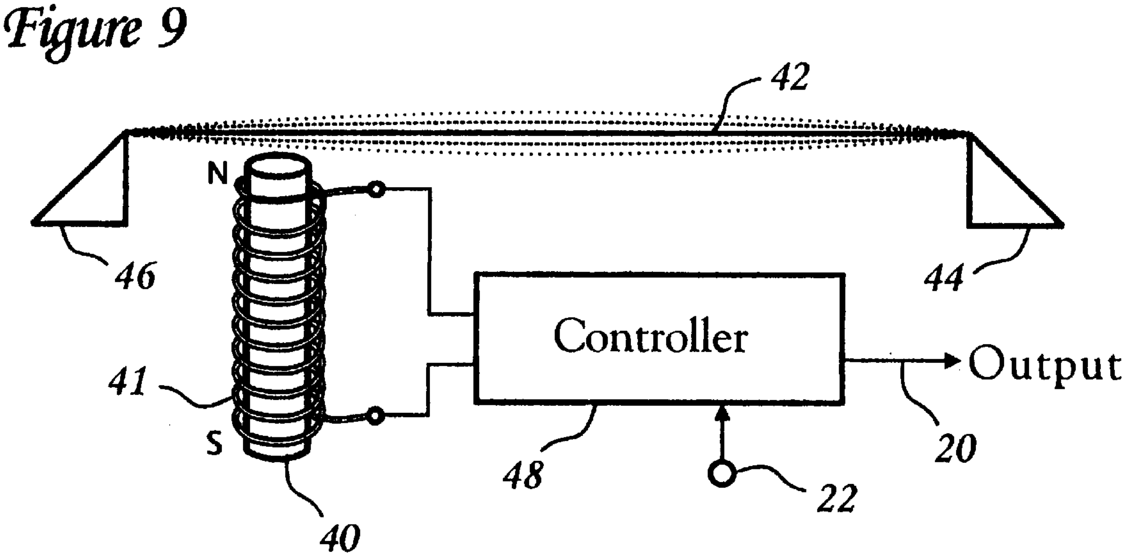
FIG. 9 is a schematic diagram of another embodiment where the senor/actuator circuit comprises a single coil wound on the transducer.

The transducer arrangement of FIG. 9 is an alternative to the more familiar transducer arrangement presented in FIG. 8. A very similar explanation applies. The only difference is that the stretched wire 42 is not electrically connected to controller 48. Instead, controller 48 is connected to a coil of wire 41 wound around magnet 40. During the sensing interval, vibration of subject wire 42 varies the reluctance of the flux path surrounding magnet 40 and generates a voltage proportional to the velocity of wire 42. During the actuating interval, actuating current passing through coil 41 gives rise to a magnetic field that, according to polarity, adds to or subtracts from the static field of the magnet and therefore modulates the pull of the magnet upon wire 42. There are workshop differences between the arrangements of FIG. 8 and FIG. 9, but the principle of operation is much the same. In the most general case, it does not matter that the subject mass is or isn't physically part of the transducer, as long as it can interact with the forces being modulated by the control system.

It is also possible to combine FIGS. 8 and 9 with the dual winding transducer of FIG. 3 in that the subject wire 42 may be connected to serve as the sensor "winding" while coil 41 serves as the actuator winding, or vice versa. Again, these variations are all subsumed within the spirit of the invention.

More than two magnetic cores and coils may be employed in variations upon these themes. Multiple windings may be connected in series, parallel, or combinations thereof. Either permanent or electromagnets can be employed to provide the magnetic bias field required for electromagnetic transducers of the variable reluctance type. Piezoelectric transducers may be glued or otherwise joined so as to act substantially as one transducer. All these alternative arrangements of transducer elements and combinations thereof are well known or readily ascertained and all fall within the scope of the present invention, provided they act substantially as one unified transducer with respect to the subject.

Particular Application of the Invention

The particular embodiment shown in FIG. 9 demonstrates the invention's full control of all important harmonic modes of vibration of a subject in the form of a string 42 of a musical instrument. Such a string supports a harmonic series of possible modes of vibration and thus provides an excellent and simple mechanical system for control by the present invention. In addition, this particular application of the invention has practical utility as a novel musical instrument.

The basic configuration is straightforward and as shown in FIG. 9, a coil of copper wire is wound about a cylindrical permanent magnet 40 composed of a ceramic magnetic material having low losses at high frequencies and one end of the resulting solenoid-type transducer is deployed in close proximity to a stretched ferrous steel musical instrument string 42. The transducer is deployed close to the secured end of the string so as to avoid zero-nodes where the amplitude of vibration is at a null. The string is plucked by the musician and a voltage wave proportional to the velocity of the string develops across transducer winding 41 of FIG. 9. This voltage wave is sampled by controller 48 during the sensor-time channel interval. During the actuating time-channel, controller 48 applies a pulse to the transducer that either lessens or increases the magnetic field pulling upon the string. Thus is described one discrete control frame. Each such frame has the effect of giving the string a little shove that is integrated by the mass of the string and contributes to a small change in its vibration. A succession of similar control frame events strongly controls the vibration of the string. The effect may be heard acoustically if the string 42 and anchors 46 and 44 are deployed upon a suitable acoustic instrument body, or the sample stream output 20 may be externally monitored by a conventional instrument amplifier.

Detailed Description of a Particular Application of the Invention

Figure 10:
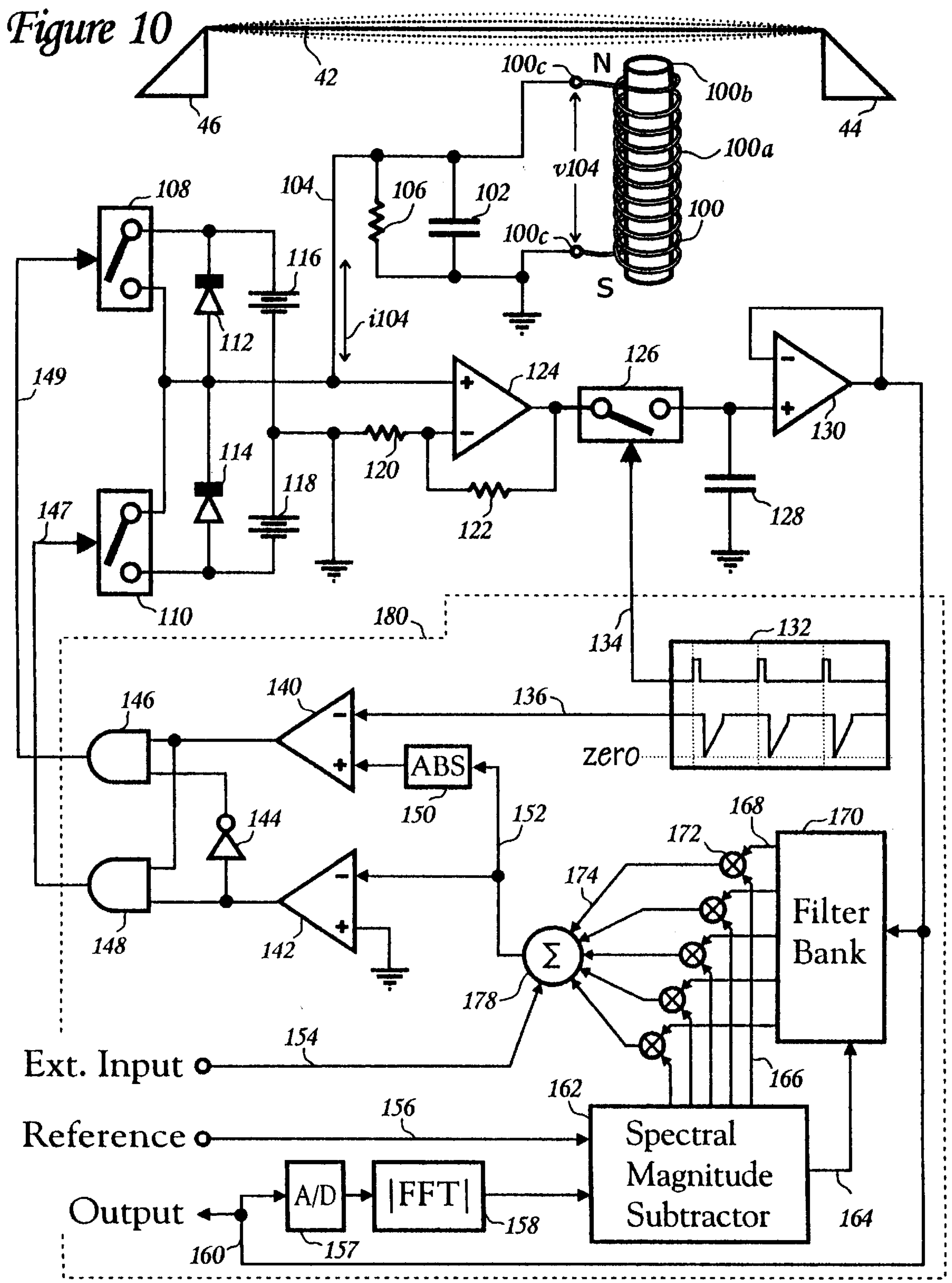
FIG. 10 is a detailed schematic diagram of an embodiment for controlling the motion of stringy a musical instrument.

FIG. 10 is a detailed circuit diagram of the control system shown in FIG. 9. Both FIG. 9 and FIG. 10 are specific instances of the general scheme of FIG. 1. Within FIG. 10, outlined circuit section 180 represents a block 24 of FIG. 1, while the rest of FIG. 10 represents one means of realizing the actuating and sensing time channel circuitry of FIG. 1 in a system based upon an electromagnetic transducer.

Within the controller circuitry of FIG. 10, a bank of controllable filters is included within the feedback path of the control loop. The spectral profile of the subject's actual vibration is obtained through Fourier transform of a sequence of samples derived from the transducer during sensing intervals. Said profile is compared to a spectral profile signal supplied as a reference and an error profile signal is generated. Each element within the error profile controls its corresponding filter signal from the filter bank to produce a correction signal that drives the transducer during the actuation time-channel intervals. Accordingly, frequency specific regenerative and degenerative forces are applied to the subject to minimize the error profile. The subject mass is caused to vibrate with a spectral profile that matches the reference spectral profile to the best degree possible, considering the subject's available modes of vibration.

Figure 11:
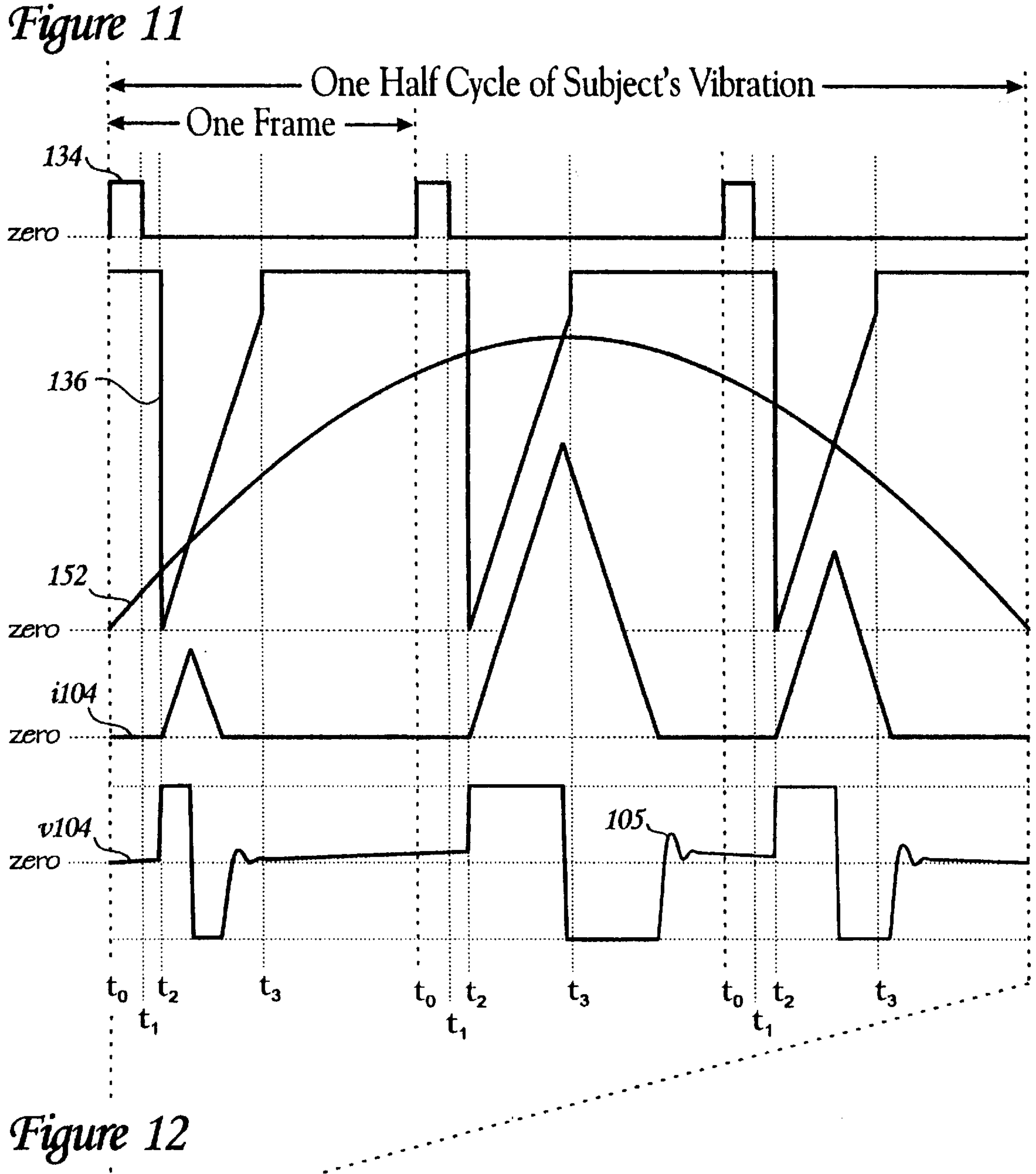
FIG. 11 is a waveform diagram showing the waveforms appearing on certain nodes of the circuit of FIG. 10. For example, waveform 134 corresponds to the voltage on node 134 of FIG. 10. A similar correspondence of reference exists between all labeled waveforms of FIG. 11 and the relate nodes of FIG. 10
Figure 12:
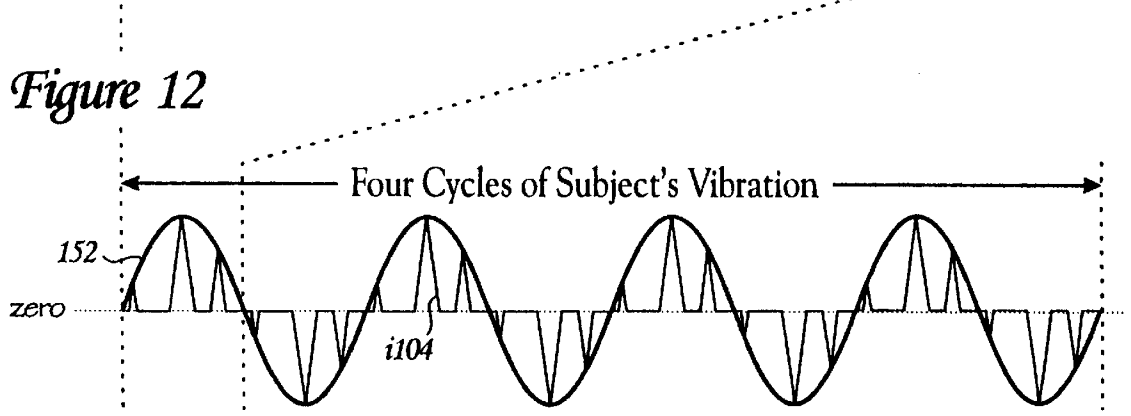
FIG. 12 is a waveform diagram showing four full cycles of the correction signal applied by the circuit of FIG. 10. The identifiers of FIG. 11 correspond to the identical identifiers of FIGS. 10 and 11.

The following description of the circuit of FIG. 10 is best read with reference to FIG. 11 and FIG. 12. The waveforms of certain circuit nodes of FIG. 10 are shown in FIGS. 11 and 12 and bear the same reference numbers.

Referring to FIG. 10, a transducer 100 consists of a coil of wire 100*a* wound about a cylindrical permanent magnet 10*b*. The transducer is deployed under ferrous steel wire string 42 stretched between anchors 46 and 44. String 42 has been plucked and is therefore vibrating. During the sensing interval a voltage v104 representative of the string's velocity is therefore generated across the sensor/actuator circuit (terminals 100*c* and coil 100*a*) of transducer 100 and is applied to buffering and scaling amplifier 124, via capacitor 102 and resistor 104. Resistors 120 and 122 determine the gain of amplifier 124. The output of amplifier 124 is applied to one terminal of electronic switch 126.

Switch 126 is controlled by signal 134 that is developed by timing generator 132. Within timing generator block 132 are shown waveforms representative of the voltage signals 134 and 136. These same signals are shown relative to other signals in FIGS. 11 and 12. Signal 134 is the sample acquisition signal. The positive pulse of signal 134 closes switch 126 during $t_0$–$t_1$ and capacitor 128 acquires a sample of the voltage output of amplifier 124. Said sample is buffered by amplifier 130 and becomes signal 160 that is available both as an output of the system and as an input to processing block 180 shown in dashed lines. Output 160 is a sampled representation of the velocity waveform of string 42.

Output 160 is applied to an analog to digital converter (D/A) 157 and the digitized samples are then fed into an algorithmic process that incorporates a number of past stored samples and calculates the magnitude of harmonics in the signal by means of the well known Fast Fourier Transform (FFT) shown as block 158. Spectral Magnitude Subtractor 162 subtracts the resulting spectrum of the actual signal from a target spectrum supplied as reference 156 and generates a set of difference or error signals one of which is signal 166. There is one such difference signal for every harmonic of interest as chosen by the designer of the system. FIG. 10 shows a system capable of controlling five harmonics but it is understood that the designer can choose any number of harmonics to control.

One multiplier system of multiplier 172 operating on signals 166 and 168 will now be explained and the same explanation will apply to all remaining multiplier sets shown in FIG. 10.

Difference signal 166 is applied to multiplier 172. The other input to multiplier 172 is signal 168, a signal from one of several filters within filter bank 170. Filter bank 170 consists of an array of bandpass filters. Each bandpass filter's transfer function should exhibit zero phase shift at the bandpass center frequency. Control signal 164 sets each filter frequency to be the same as the frequency of the element of the FFT magnitude output record for which an output, such as output 166, is provided. The "Q" or resonance of each filter may be either fixed or adjustable by control signal 164. Subject velocity signal 160 is fed to this filter bank where it is split, in the present case, into five discrete harmonic components one of which is signal 168. Multiplier 172 generates the product of difference signal 166 and spectral component 168. If the reference is greater than the subject's spectra at the frequency of interest, signal 166 is a positive level and harmonic component output 174 of multiplier 172 will act regeneratively upon the subject to increase the amplitude of vibration at that frequency. In contrast, if the reference is less than the subject's spectra at the frequency of interest, signal 166 is a negative level and the harmonic component output 174 of multiplier 172 will be inverted in polarity and will act degeneratively upon the subject to decrease the amplitude of vibration at that frequency.

All of the multiplier outputs are summed together by summing block 178 and the resulting correction signal 152 is applied to the actuator channel path of the circuit. By the means just described, the magnitude and polarity of the control loop gain is controlled at every frequency of interest to compel and constrain the modes of vibration of string 42 to closely resemble reference spectrum 154.

As described above, one suitable definition of filter bank 170 is an array of variable bandpass filters. Signal 164 represents a set of tuning parameters that optionally adjusts the center frequencies of filter bank 170 to the actual center frequencies of the harmonics as measured by FFT process 158. In this arrangement, the first harmonic of the harmonic spectrum of the reference is effectively aligned to the first harmonic of the subject's vibration. The filters of filter bank 170 are therefore moved to align with the harmonic series that corresponds to the subject's possible modes of vibration at any fundamental frequency of the subject. This is shown in FIG. 10.

In one alternative case, filter bank 170 consists of fixed filters, the harmonic spectrum is aligned to an absolute frequency and the harmonic series of the subject's actual vibration will change according to the particular first harmonic frequency of the subject's vibration.

Both approaches have practical musical uses. The former approach is more useful as a pure synthesis method while the latter approach is more useful in emulating different kinds of instruments or voices where each has a fixed harmonic signature.

Many other variations upon this scheme are possible. FFT process 158 may be omitted in the fixed scheme, as filter bank 170 provides similar spectral information by band-filtering output 160. The explicit multipliers and the summing block 178 may be omitted and the equivalent functionality can be achieved by manipulation of the phase response of filter bank 170 via signal 164. This last method requires an all-pass filter response having a controllable phase response to be substituted for the bandpass filters of filter bank 170 and the multipliers of type 172. All of these variations have in common the ability to control the phase and/or polarity of each important harmonic in the feedback signal that actuates the subject so that regenerative and degenerative feedback can compel and constrain the subject's vibration to conform to or resemble a reference harmonic spectrum. All such variations fall within the intent, spirit and scope of the present invention.

Systems that dampen all vibration and systems that sustain vibration are special cases of the general case presented above. If the reference 156 is zero at all frequencies, correction signal 152 of summing block 178 will deliver degenerative feedback to the string at all frequencies. If the reference is maximal at all frequencies, then signal 152 will deliver regenerative feedback at all frequencies. In these two special cases, the entire circuitry of blocks 157, 158, 162, 170, and the multipliers can be dispensed with. Output 160 could be connected directly to multiplier 172, replacing signal 168 and the reference would be applied directly as signal 166 to the same multiplier. With this simplified configuration, a reference of +1 would cause the string's vibrations to sustain while a reference of −1 would cause the string's vibrations to be dampened. A simple circuit can thus be constructed to achieve these two aims without the complexity of the digital signal processing required to achieve complete, independent control of all of the string's harmonics. Even that minimal version of the invention would achieve the aim of the electrode damping system disclosed in the aforementioned '474 patent and the basic objective of the string vibration sustaining system disclosed in the '526 patent. Circuit area 180 of FIG. 10 has been deliberately presented with some ambiguity with respect to whether digital signal processing ("DSP") or analog signal processing circuitry is employed. As discussed above, the basic functions of sustain and damping can be realized without DSP using simple analog components. Certainly the FFT function is better realized digitally. Filter bank 170, the multipliers, the summing block and a pulse-width modulator ("PWM") to be described could be deployed using analog circuits and simple logic gates as shown in FIG. 10. However, it is expected that modern advanced realizations of the invention will implement all of the functionality of circuit area 180 most economically using A/D and D/A converters and DSP programs.

Correction signal 152, shown graphically in FIGS. 11 and 12, is applied to a PWM circuit. Comparator 142 detects the polarity of signal 152. Absolute value calculator 150 applies the magnitude of signal 152 to one input of comparator 140. The other input of comparator 140 is supplied by signal 136, a voltage ramp that occurs identically during every time interval $t_2$–$t_3$ of every frame as shown in FIG. 11. The maximum magnitude of signal 152 is constrained by design to never exceed the most positive ramp voltage. The polarity and shape of the ramp voltage is illustrated within block 132 and in FIG. 11. The comparison of the signal magnitude against this ramp voltage produces a PWM signal that is active only during the $t_2$–$t_3$ frame interval. AND gates 146 and 148 and inverter 144 perform a data directing function according to the polarity-sensing output of comparator 142. The data director function directs the PWM signal to either signal line 149 or 147 but not to both, according to the polarity of signal 152. This completes the PWM function description. Any circuit or DSP program that could be functionally substituted for the PWM circuit just described would fall within the spirit and intent of the invention.

Switches 108 and 110 may be bipolar, MOSFET, IGBT transistor switches or any other suitable kind. Voltage translation and buffering circuitry for driving these switches with signals 147 and 149 from the AND gates is not shown, but one skilled in the art will have no difficulty supplying such details.

Assume the particular present control frame signal processing block 180 has calculated that a positive output of some force duration is required to achieve the aims of its algorithm. Gate 146 then asserts signal 149 for the calculated time interval. This closes switch 108 and connects the transducer sensor/actuator circuit to voltage source 116. Current i104 ramps up through the transducer 100 (more specifically winding 10*a*). The volt-seconds stored in the inductance of transducer 100 is proportional to the time switch 108 remains closed. Waveform i104 of FIG. 11 and FIG. 12 shows current i104. Once switch 108 is opened the stored energy in the transducer inductance must discharge. The transducer inductance, in trying to maintain previous current, snaps voltage v104 down against catch diode 114. See waveform v104 of FIG. 11. Current then flows from transducer 100 through diode 114 into voltage source 118 until the transducer inductance resets. As the current declines, diode 114 eventually stops conducting and the magnitude of the voltage v104 gradually falls back to whatever voltage is being generated in the transducer as a consequence of the string's velocity.

The preceding explanation applies when negative voltage switch 110 is closed by gate output 147, but with the following differences: All currents and voltages are reversed in polarity. The roles previously assumed by diode 114 and voltages 116 and 118 are assumed by diode 112 and voltages 118 and 116 respectively.

Once everything is reset, the next frame begins anew with a new sensing interval and everything happens all over again, with incrementally different duration, currents and voltages according to the control system's incremental response to the progress of the string through its cycle of vibration. FIG. 12 shows 4 cycles of the subject's vibration and shows the polarity of i104 changing as described.

During the settling of voltage v104 at the end of each actuating event, there is likely to be quite a bit of ringing due to the exchange of energy between the transducer inductance and parasitic circuit capacitances. Resistor 106 serves to dampen this settling transient and the purpose of capacitor 102 is to swamp out the parasitic capacitance with a larger and well-controlled capacitance. Waveform v104 of FIG. 11 shows the settling 105 of voltage v104 that obtains when the values of resistor 106 and capacitor 102 are such that the system is slightly underdamped.

One skilled in the art will recognize that amplifier 124 must be able to withstand the large actuating voltages applied to its input at node 104 while being able to recover and accurately amplify the relatively small voltages generated by the transducer due to string velocity. Numerous such practical details have been omitted herein for clarity but the essentials presented will enable one skilled in the art to construct a working system.

Sensing the position of the subject relative to the transducer is one of the stated goals of the invention. Referring again to FIG. 10 and FIG. 11, the duration of the settling time of voltage v104 after diode 116 or 118 stops conducting contains information about the position of the subject relative to the transducer. The strength and therefore the accuracy of this effect depends upon the size and the material composition of the subject. Specifically, the ratio of the volt-seconds delivered to the transducer versus the decay time to the voltage zero crossing following an actuation event is indicative of the proximity of the subject to the transducer. The control system may include processing for calculating this ratio and thus the position of string 42 relative to transducer 100. Adding this feature to the circuit of FIG. 10 requires that a zero comparator be connected to the output of amplifier 124. The output of the zero comparator alerts the DSP system when the zero crossing occurs. The DSP can use the calculated position feedback to control not just the velocity but the position of the subject. This amounts to adding the DC or zero hertz frequency component to the harmonic series controlled by the invention and constitutes true complete control of all motion that can be expressed in the frequency domain.

While the circuit of FIG. 10 is specific to an electromagnetic transducer, the invention can employ a transducer of any suitable type including the piezoelectric type. The FIG. 10 circuit explanations pertaining to harmonic control are intended to apply to any realization of the invention using any suitable transducer type. Modifications to translate FIG. 10 from an electromagnetic transducer control system to one that uses a piezoelectric or other transducer type, will be obvious to one skilled in the art of transducer interfacing.

FIG. 10 shows a unified transducer sensor/actuator circuit 100/100*c* but the previously discussed transducer wiring variations of FIGS. 3 through 7 may be applied without departing from the invention's intended domain. In the case of the dual winding transducer of FIG. 3, node 104 would then be broken into two distinct nodes, one connecting the actuating current to one coil of the transducer, and the other connecting the input of sensor amplifier 124 to the other coil. As the coils are closely coupled through inductance, substantially the same voltages will appear on both circuits.

The simple transducer 100 of FIG. 10 may be advantageously replaced by a "humbucking" transducer of the type shown in FIG. 6. This connection, known for several decades and in the public domain, tends to cancel external interference during the sensing interval. When used with the present invention the humbucking connection tends to reduce the electric field emitted by the transducer during the actuating interval. This later advantage is important in helping devices built from the invention to pass emission limits set by the FCC and other regulatory bodies.

For simplicity, the circuit of FIG. 10 used to actuate the transducer is shown as a half-bridge with switches 108 and 110. A full bridge consisting of four switches may be employed to drive the transducer with twice the voltage with the same power supplies used for the half-bridge. The relative merits and implementations of full-bridges and half bridges as drivers for transducer loads are well known in the art of switching amplifiers and linear amplifiers and all such circuits that are suitable fall within the spirit and scope of the present invention.

The specific examples presented herein are intended to clarify the invention but not to limit its scope. Many different embodiments of the present invention are possible and will prove applicable to motion and vibration control problems in many fields. All fall within the true spirit and scope of the invention as defined in the appended claims.

What is claimed is:

1. In a control system for controlling the motion of a physical subject, the combination comprising:

a unitary transducer adapted to be coupled to the physical subject, the transducer being arranged to provide a sensing output signal in accordance with the motion of the subject and to effect a change in said motion in accordance with an actuating signal applied thereto; and a controller coupled to the transducer, the controller being programmed to respond to the sensing output signal during a sensing time channel portion of successive time frames and apply an actuating signal to the transducer during a separate actuating time channel of the time frames, whereby the sensing and actuating functions of the transducer are separated in time, the rate of occurrence of successive time frames being independent of the motion of the subject.

2. The control system of claim 1 wherein the controller is arranged to respond to an input signal and provide an actuating signal to the transducer which is a function of the input and sensing output signals.

3. The control system of claim 2 wherein the input signal is a reference signal which prescribes the desired state of motion of the subject.

4. The control system of claim 2 wherein the transducer is electromagnetic.

5. The control system of claim 2 wherein the transducer is piezoelectric.

6. The control system of claim 3 wherein the controller includes a sample and hold circuit for sampling the sensing output signal and retaining the signal for a preselected period of time.

7. The control system of claim 3 wherein the controller includes an A/D converter for converting the sampled sensing output signal to a digital format.

8. The control system of claim 3 wherein the actuating signal is in the form of an amplitude modulated signal.

9. The control system of claim 3 wherein the actuating signal is in the form of a pulse width modulated signal.

10. The control system of claim 3 wherein the actuating signal is in the form of a combined amplitude and pulse width modulated signal.

11. The control system of claim 3 wherein the control system is arranged to provide the actuating signal in the form a current from a high impedance source.

12. The control system of claim 3 wherein the control system is arranged to provide the actuating signal in the form of a voltage from a low impedance source.

13. The control system of claim 3 wherein the function of the reference and sensing output signals is a correction signal constituted to reduce the deviation of the subjects motion from the desired motion and wherein the actuating signal has a waveform shaped that is a smooth curve beginning and ending at zero and that is amplitude and polarity modulated by the correction signal.

14. In a control system for controlling the motion of a physical subject, the combination comprising:

a unitary transducer having a sensor/actuator circuit, the transducer being adapted to be coupled to the physical subject for providing a sensing output signal on the sensor/actuator circuit in accordance with the motion of the subject and for effecting a change in the motion of the subject in accordance with an actuating input signal applied to the sensor/actuator circuit;

a controller coupled to the transducer sensor/actuator circuit, the controller being arranged to respond to sensing output signal during a first or sensing portion of a time frame and to apply an actuating input signal to transducer during a second or actuating portion of the time frame for the purpose of separating and isolating sensing events from actuating events in time and for selectively damping or enhancing the motion of the subject over a succession of said time frames.

15. The control system of claim 14 wherein the transducer is electromagnetic.

16. The control system of claim 14 wherein the transducer is piezoelectric.

17. The control system of claim 14 wherein the desired state of motion of the physical subject is dictated by a reference signal and wherein the controller has:

a reference input for receiving the reference signal;

means for processing the transducer sensing output signal according to the reference signal to produce a correction signal and applying the correction signal, as the actuating input signal to the sensor/actuating circuit to control the actuating force emitted by the transducer during the actuating time interval whereby the subject is constrained to conform to the motion dictated by the reference signal.

18. The control system of claim 17 further including a source of an excitation signal coupled to the controller for providing an excitation signal to the transducer sensor/actuator circuit independently of the correction signal, whereby the motion or position of the subject can be directly influenced.

19. The control system of claim 14 wherein the controller includes a sample and hold circuit for sampling the transducer sensing output signal and retaining said signal for a preselected time period.

20. The control system of claim 14 wherein the controller includes an analog to digital convertor for sampling and retaining the transducer sensing output signal and converting it to digital form for further processing by the controller.

21. The control system of claim 14 wherein the controller is arranged to apply the actuating signal to the transducer in the form of an amplitude modulated signal during the actuation portion of said time frames.

22. The control system of claim 14 wherein the controller is arranged to apply the actuating signal to the transducer in the form of a pulse width modulated signal during the actuation portion of said time frame.

23. The control system of claim 14 wherein the controller is arranged to apply the actuating signal to the transducer in the form of a combined amplitude and pulse width modulated signal.

24. The control system of claim 14 wherein the actuating signal applied to the transducer is in the form of a current emanating from a high impedance source.

25. The control system of claim 14 wherein the control system is arranged to provide the actuating signal in the form of a voltage from a low impedance source.

26. The control system of claim 17 wherein the actuating signal is a current pulse in the shape of a smooth curve that begins and ends at zero and is amplitude and polarity modulated by the correction signal over a succession of frames.

27. The control system of claim 15 wherein the transducer sensor/actuator circuit comprises a single winding for providing the sensing output signal and for receiving the actuating signal.

28. The control system of claim 15 wherein the transducer sensor/actuator circuit comprises separate sensor and actuating windings.

29. The control system of claim 15 wherein the subject includes the transducer sensor/actuator circuit.

30. The control system of claim 15 wherein the subject includes part or parts of the electromagnetic transducer other than the winding.

31. The control system of claim 16 wherein the transducer sensor/actuator circuit comprises a single pair of electrodes.

32. The control system of claim 16 wherein the transducer sensor/actuator circuit comprises separate sensing and actuating electrodes or electrode pairs.

33. The control system of claim 16 wherein the subject and transducer form one element.

34. The control system of claim 14 wherein the controller is arranged to vary the duration of the individual time frames making up said successive time frames.

35. In a method for controlling the motion of a physical subject in accordance with the motion prescribed by a reference signal, the combination comprising:

a transducer coupled to the physical subject, the transducer having a sensor/actuator circuit which provides a sensing output signal during a sensing portion of a single time frame representative of the motion of the physical subject and in response to an actuating input signal applied to the sensor/actuator circuit during a separate actuating portion of said time frame provides an actuating force to the physical subject;

comparing the transducer sensor output signal with the reference signal to provide an error signal; and processing the sensor output signal as a function of the error signal to create a correction signal; and modulating with the correction signal to form the actuating signal; and applying the actuating signal to the transducer sensor/actuator circuit during the actuating portion of said time frame.

36. The method of claim 35 wherein the step of processing the sensor output signal comprises controlling the phase of correction signal at a set of control frequencies such that the correction signal acts to promote vibration of the subject at one subset of said set of frequencies and to inhibit vibration of the subject at a second subset of said set of frequencies.

37. The method of claim 36 further including the step of providing an error data signal that represents the difference result of comparing the magnitude of a frequency domain representation of the transducer sensor output signal against a template frequency domain magnitude representation signal supplied to the system as a reference input and wherein the step of controlling the phase of the correction signal including controlling the gain and phase of the filler at each control frequency in accordance with the error data signal.

38. The method of claim 37 wherein the reference input signal represents the harmonic structure of the desired subject vibration in the form of a frequency domain magnitude representation signal, wherein the error signal is in the form of an error data which represents the different result of comparing the magnitude of a frequency domain representation of the transducer sensor output signal against the reference signal, and wherein the step of controlling the phase and amplitude of the correction signal includes passing the sensor output signal through a filter or bank of filters and controlling the gain and phase of the filter or bank of filters at each control frequency in accordance with the error data signal.

* * * * *